(12) United States Patent
Schiraga

(10) Patent No.: US 11,304,524 B2
(45) Date of Patent: Apr. 19, 2022

(54) SURFACE ADAPTIVE TENSION-COMPRESSION BASE STRUCTURE AND APPARATUS USING THE SAME

(71) Applicant: Seton Schiraga, Alameda, CA (US)

(72) Inventor: Seton Schiraga, Alameda, CA (US)

( * ) Notice: Subject to any disclaimer, the term of this patent is extended or adjusted under 35 U.S.C. 154(b) by 16 days.

(21) Appl. No.: 16/843,560

(22) Filed: Apr. 8, 2020

(65) Prior Publication Data

US 2020/0229600 A1 Jul. 23, 2020

Related U.S. Application Data

(63) Continuation-in-part of application No. 15/686,997, filed on Aug. 25, 2017, now Pat. No. 10,624,455.

(60) Provisional application No. 62/469,118, filed on Mar. 9, 2017.

(51) Int. Cl.
*A47B 91/16* (2006.01)
*A47C 7/00* (2006.01)
*F16M 11/20* (2006.01)

(52) U.S. Cl.
CPC .............. *A47B 91/16* (2013.01); *A47C 7/008* (2013.01); *F16M 11/2078* (2013.01)

(58) Field of Classification Search
CPC ..... A47B 91/16; A47C 7/008; F16M 11/2078
See application file for complete search history.

(56) References Cited

U.S. PATENT DOCUMENTS

| 216,629 | A | | 6/1879 | Powell |
| 2,139,673 | A | | 12/1938 | Draper |
| 3,063,521 | A | | 11/1962 | Buckminster |
| 4,148,520 | A | | 4/1979 | Miller |
| 4,266,748 | A | | 5/1981 | Dalton |
| 4,290,643 | A | | 9/1981 | Logan, 3rd. |
| 4,354,437 | A | * | 10/1982 | Logan ..................... A47B 3/00 108/128 |
| 4,421,356 | A | | 12/1983 | Singer |
| 4,585,270 | A | | 4/1986 | Singer |
| 4,934,638 | A | | 6/1990 | Davis |
| 5,350,151 | A | | 9/1994 | Aoki |
| 6,634,704 | B1 | | 10/2003 | Bergquist |
| 6,871,905 | B2 | | 3/2005 | Grace |
| 6,901,714 | B2 | | 6/2005 | Liapi |

(Continued)

*Primary Examiner* — Anita M King
(74) *Attorney, Agent, or Firm* — Innovation Capital Law Group, LLP; Vic Lin

(57) ABSTRACT

A tension-compression base structure includes tension elements (such as flexible cables or ropes) and compression elements (such as rigid legs) with a slidably adjustable path for the tension elements around or within the compression elements, thereby enabling a degree of adaptability to support surfaces that may not be ideally flat, such as on outdoor terrain. Such a tension-compression base may be used to support a platform that may be desirably held in a preferred orientation irrespective of terrain irregularities. Height adjustment of the platform can be achieved via a telescoping mechanism, a gas spring, or the like, at the one or both ends of the compression members of the structure. A spring or other compliant member inline with the "loop" tension member can be included. The spring also can remove the requirement for fine adjustments of tension elements during normal service. The spring can benefit various tension-compression base structures.

19 Claims, 18 Drawing Sheets

(56) References Cited

U.S. PATENT DOCUMENTS

| | | |
|---|---|---|
| 7,063,388 B2 | 6/2006 | Chen |
| 7,370,908 B2 | 5/2008 | Crowell |
| 7,401,858 B2 | 7/2008 | Lee |
| 7,922,134 B2 | 4/2011 | Gasser |
| 8,616,328 B2 | 12/2013 | Daraio et al. |
| 8,875,723 B2 | 11/2014 | Brown |
| 9,049,922 B2 | 6/2015 | Schlueter |
| 9,511,786 B1 | 12/2016 | Hickcox |
| 9,913,542 B2 | 3/2018 | Chiasson |
| 10,080,429 B2 * | 9/2018 | Schiraga ................. A47C 4/04 |
| 10,624,455 B2 * | 4/2020 | Schiraga ................ A47C 7/008 |
| 2006/0012235 A1 | 1/2006 | Chen |
| 2007/0216212 A1 * | 9/2007 | Micheel ................ A47C 9/105 297/451.2 |
| 2013/0187431 A1 * | 7/2013 | Grace ...................... A47C 4/00 297/452.48 |
| 2015/0351548 A1 | 12/2015 | Schiraga |
| 2018/0035815 A1 | 2/2018 | Elmi |

* cited by examiner

SURFACE ADAPTIVE TENSION-COMPRESSION BASE STRUCTURE AND APPARATUS USING THE SAME

CROSS-REFERENCE TO RELATED APPLICATIONS

This application is a continuation-in-part of U.S. patent application Ser. No. 15/686,997, filed Aug. 25, 2017, which claims the benefit of priority to U.S. Provisional Patent Application No. 62/469,118, filed Mar. 9, 2017, the contents of which are herein incorporated by reference.

BACKGROUND OF THE INVENTION

1. Field of the Invention

The invention relates to base structures capable of supporting a mass over a support surface, and more particularly to adaptive tension-compression base structures capable of holding a preferred orientation over irregular terrain.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The term "tensegrity" was originally coined by futurist designer and inventor R. Buckminster Fuller in the 1960s to describe systems of tension elements (e.g., ropes, cables, or cords) and compression elements (e.g. bars, rods, tubes, or other rigid strut-type components) held in a state of static pre-stressed equilibrium to define a three-dimensional frame structure, wherein the compression elements generally do not touch each other. The pulling forces applied by the tension elements are resisted by the rigid compression elements, and a tensegrity system remains stable even against externally applied forces. The word "tensegrity" itself combines "tension" and "structural integrity." Fuller's U.S. Pat. No. 3,063,521 (filed in 1959 and issued in 1962) covers various basic tensegrity concepts, and Fuller and others have patented many variations since then.

When designed and constructed properly, tensegrity structures have proven to be robust and durable. Pioneering sculptor Kenneth Snelson's well-known "Needle Tower" sculpture, constructed of metal tubes and wire, has stood outdoors at the Hirshhorn Museum in Washington, D.C. for decades. Tensegrity structures can be suitable for furniture as well. A line of tensegrity sitting stools named after Snelson is offered by designer Sam Weller (samweller.co.uk).

The tensegrity concept has been well developed and used frequently in the decades since the 1960s (and even before then, as some structures—including the London Skylon tower dating from 1951—employed some tensegrity principles even before the term was coined). Tensegrity is capable of enabling lightweight but robust structures combined with artful design; there are many designs for furniture, bridges, buildings, sports stadiums, toys, and other structures—large and small—that employ tensegrity principles.

But for all their benefits, most tensegrity structures remain rigid and poorly adapted to use upon irregular surfaces. The pre-stressed balance between tension and compression provides little freedom for movement. Because of this, tensegrity furniture is not often suitable for use outdoors. The Snelson stools referenced above, for example, remain flat and balanced only on a flat floor; on an inclined surface the entire structure including the seating surface will also be inclined and vulnerable to tipping over, and on an irregular surface the legs of the stool will wobble. This, unfortunately, also holds true for many other pieces of tensegrity furniture.

Accordingly, there is a need for an adaptive tension-compression structure based on tensegrity principles but more capable of being used on inclined and irregular surfaces. Such a structure would be easily adjustable to various support surfaces and yet remain strong and stable as furniture or as a base for equipment or other objects.

SUMMARY OF THE INVENTION

Embodiments of the present invention provide a tension-compression base structure comprising at least three independent, physically separate compression elements, each having a first end and a second end; at least one tension element; a constraint at the first end of the structure, the constraint operable to hold each of the first ends of the compression elements in a desired configuration; and at least one tensioning member is provided inline with the at least one tension element to provide a predetermined tension therein, wherein the at least one tension element connects one of the compression elements near the first end thereof to another of the compression elements near the second end thereof, holding the compression elements and the at least one tension element in a pre-stressed static equilibrium position; and the at least one tension element is configured to be slidably adjusted with respect to at least one of the second ends of the tension elements.

Embodiments of the present invention further provide a tension-compression base structure comprising at least three independent, physically separate compression elements, each having a first end and a second end; at least one tension element; a constraint at the first end of the structure, the constraint operable to hold each of the first ends of the compression elements in a desired configuration; at least one fixed length tension element connecting one of the compression elements near the first end thereof to another of the compression elements near the second end thereof; and a telescoping member operable to extend from at least one of the first end and the second end of each of the compression elements, the telescoping member adjusting a length between the constraint and a distal end, relative the constraint, of the telescoping member, wherein the at least one tension element connects one of the compression elements near the first end thereof to another of the compression elements near the second end thereof, holding the compression elements and the at least one tension element in a pre-stressed static equilibrium position.

Embodiments of the present invention also provide a tension-compression base structure comprising at least three independent, physically separate compression elements, each having a first end and a second end; at least one tension element; a constraint at the first end of the structure, the constraint operable to hold each of the first ends of the compression elements in a desired configuration; at least one fixed length tension element connecting one of the compression elements near the first end thereof to another of the compression elements near the second end thereof; a telescoping member operable to extend from at least one of the first end and the second end of each of the compression elements, the telescoping member adjusting a length between the constraint and a distal end, relative the constraint, of the telescoping member; and at least spring provided inline with the at least one tension element to provide a predetermined tension therein, wherein the at least one tension element connects one of the compression elements near the first end thereof to another of the compression elements near the second end thereof, holding the compression elements and the at least one tension element in a pre-stressed static equilibrium position.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
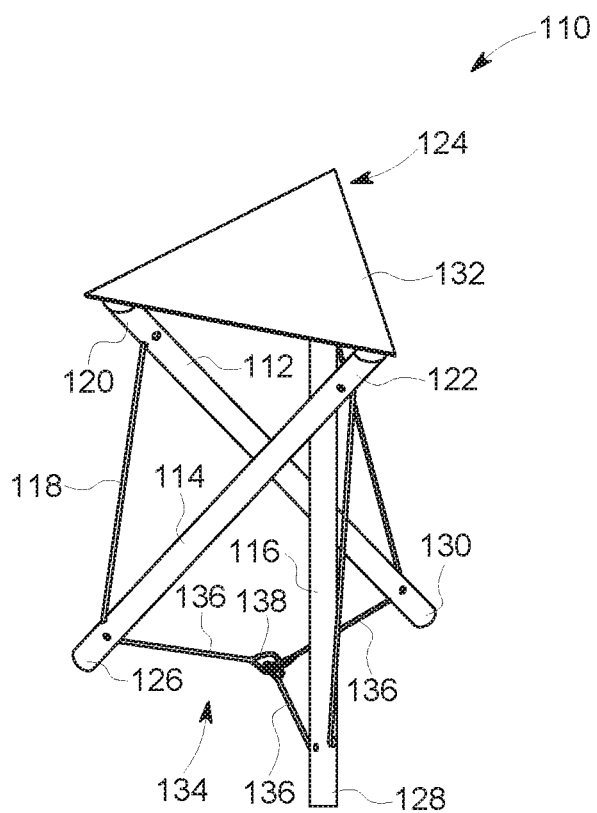
FIG. 1 is a perspective view of a base structure according to the invention capable of serving as a stool, including three compression elements serving as legs and an upper surface seating platform.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a tension-compression base structure including tension elements (such as flexible cables or ropes) and compression elements (such as rigid legs) with a slidably adjustable path for the tension elements around or within the compression elements, thereby enabling a degree of adaptability to support surfaces that may not be ideally flat, such as on outdoor terrain. Such a tension-compression base may be used to support a platform, a stool, or an item of equipment that may be desirably held in a preferred orientation irrespective of terrain irregularities. Height adjustment of the upper platform can be achieved via a telescoping mechanism at the one or both ends of the compression members of the structure. A spring or other compliant member inline with the "loop" tension member can be included. The spring can remove the requirement for fine adjustments ("tuning") of tension elements during normal service due to rope stretch, swell, or the like. The spring can benefit structures made of fixed length compression members as well, and structures made without platforms and ball joints.

FIG. 1 illustrates a tension-compression base structure 110 according to the invention configured as a stool. There are three compression elements 112, 114, and 116 illustrated and serving as legs; they are arranged generally as a tensegrity prism—i.e., as illustrated, a triangular prism wherein the top and bottom triangles are rotated with respect to each other. This arrangement, with tension elements 118 stretched between a first (upper) end 120, 122, and 124 of each of the legs and a second (lower) end 126, 128, and 130 of one of the adjacent legs, is a stable tensegrity configuration. Although FIG. 1 shows three compression elements or legs 112, 114, and 116, it should be noted that tensegrity configurations are possible having other numbers of compression elements. It should further be noted that the arrangement of the legs might not be strictly prismatic, as the term is generally understood; the leg spacing at the upper ends may differ from the spacing at the lower ends.

The stool 110 of FIG. 1 includes a platform 132 at the upper end. As illustrated, the platform may be essentially rigid, or in an embodiment of the invention it may be soft and compliant (and, for example, made from a suitable fabric). This platform 132 serves as a seat for the stool 110. Regardless of whether the platform 132 is rigid or flexible, the platform also maintains the upper ends 120, 122, and 124 of the legs 112, 114, and 116 in a desired maximum spacing, which in the case of the illustrated stool 110 is essentially an equilateral triangle (though in alternative embodiments of the invention, the triangle need not be equilateral). The platform prevents the upper ends 120, 122, and 124 of the legs 112, 114, and 116 from moving outward more than the size of the platform 132 accommodates. Accordingly, if the platform 132 is rigid, the legs 112, 114, and 116 may be pivotably attached at or near a periphery of the platform 132 in a triangular configuration. If the platform 132 is soft and flexible, pockets may be formed near the edge of the platform 132 to accommodate the upper ends 120, 122, and 124 of the legs 112, 114, and 116, or the legs may be flexibly fastened to the platform 132 in another suitable manner. In an embodiment of the invention the pockets are spaced relatively equally around the perimeter of the platform, but they need not be evenly spaced.

Figure 11:
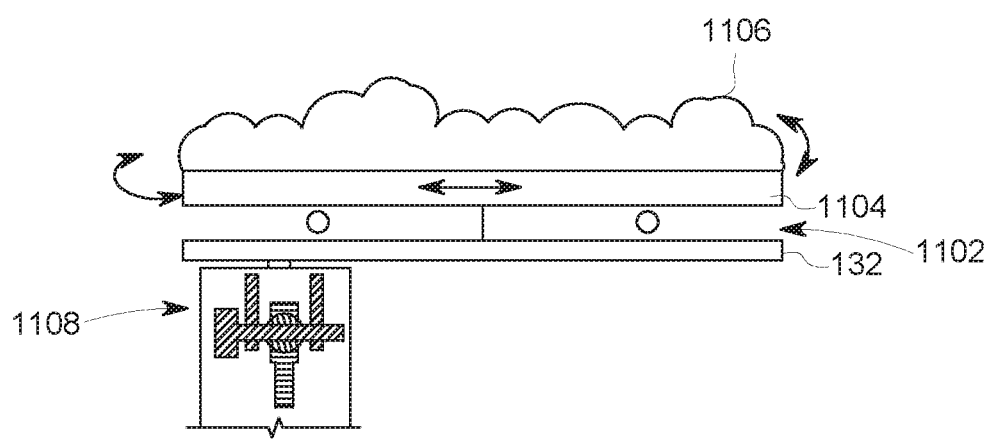
FIG. 11 is a side view showing a swivel seat disposed on the base structure of FIG. 1, with two compression elements removed for clarity.
Figure 12:
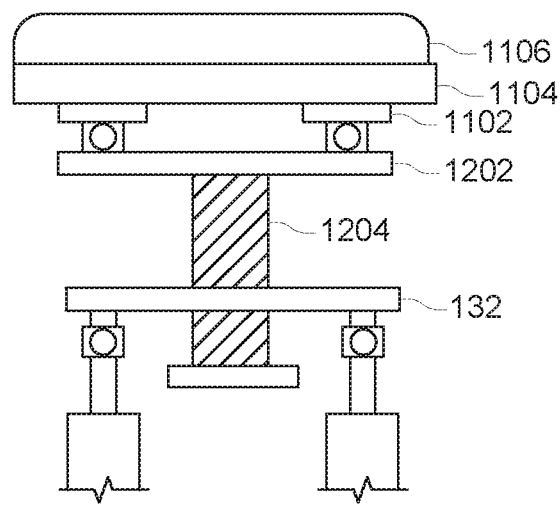
FIG. 12 is a side view of the swivel seal of FIG. 11 including an optional seat height adjustment mechanism.

In some embodiments, as shown in FIGS. 11 and 12, the platform 132 can form a base supporting a rotation element 1102, such as a "lazy Susan" swivel connector, using, for example, ball bearings, rotational bushings or the like. A seat support 1104 may be attached to a top side of the rotation element 1102, permitting rotation between the platform 132 and the seat support 1104. A seat 1106 can be disposed on top of the seat support 1104. The platform 132 and the seat support 1104 may be of the same or different shape and may be formed in various geometric or non-geometric shapes. Typically, the seat 1106 can be formed as the same shape as the seat support 1104, although such symmetry is not necessary.

The legs 112, 114, and 116 may attach to the platform 132 by various compliant connections 1108, such as rod-ends, ball and socket connections, fabric pockets rigidly affixed to the lower surface of the platform 132, or the like.

As shown in FIG. 12, in some embodiments, a height adjustment mechanism 1204 may connect the platform 132 to an intermediate platform 1202 so that the distance between the platform 132 and the intermediate platform 1202 may be varied by the user. In some embodiments, the height adjustment mechanism 1204 may be a screw. In other embodiments, the height adjustment mechanism 1204 may be a hydraulic, scissor lift, gas cylinder, circular cams or other mechanical adjustment system as may be known in the art.

The rotation element 1102 may be mounted between the intermediate platform 1202 and the seat support 1104. In some embodiments, the rotation element 1102 may be disposed between the platform 132 and the intermediate platform 1202, where the height adjustment mechanism 1204 may be disposed between the intermediate platform 1202 and the seat support 1104.

In the illustrated embodiment, the compression elements, or legs 112, 114, and 116, are fabricated from tubes of a suitably strong metal, such as steel, though other materials may of course be used. This tubular construction enables a lightweight structure. Feet may be provided at the lower ends of the legs to provide good frictional contact with the terrain; such feet may optionally be pivoting.

When tubes are used as the compression elements 112, 114, and 116, the tension elements 118 extending between the upper portions of each leg and the lower portion of adjacent legs may be formed from a single loop of rope or cable; this configuration will be discussed further in connection with FIG. 10 below. In this disclosed single loop configuration, the tension elements 118 extend externally between an upper portion 120 of a first leg 112 and a lower portion 126 of a second leg 114, then internally within the tube-shaped second leg 114 from its lower portion 126 to its upper portion 122, then externally between the upper portion 122 of the second leg 114 to a lower portion 128 of a third leg 116, then internally within the third leg 116, then externally from a upper portion 124 of the third leg 116 to a lower portion 130 of the first leg 112, then internally within the first leg 112 to the upper portion 120 thereof to complete the loop. In an embodiment of the invention, the tension elements 118 need not be positioned inside the legs; but rather, are guided adjacent to the legs by eyes, pulleys, or other suitable structures. In such a case, the legs may be made from any suitably rigid material, such as metal, wood, or some plastics or composites.

The tension-compression structure disclosed herein further includes a lower end constraint 134, which as illustrated includes a plurality of tension segments 136 (preferably flexible) fixably attached to the lower portion 126, 128, and 130 of each of the legs 112, 114, and 116 and joined at a junction 138 at a midpoint. Other embodiments of constraints are possible here; the lower end constraint 134 might take a triangular configuration (like the platform 132) or may be rigid in nature.

Figure 2:
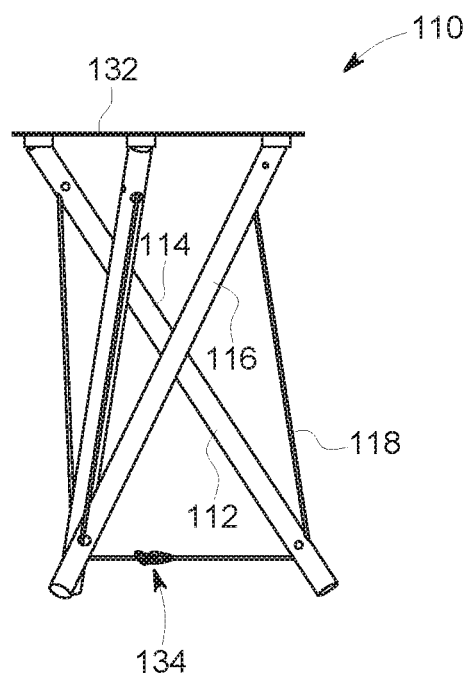
FIG. 2 is a side view of the base structure of FIG. 1.
Figure 3:
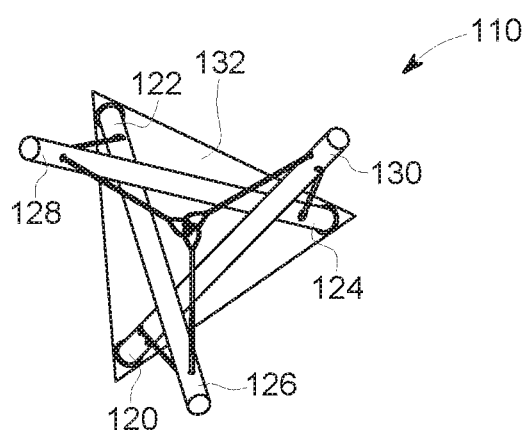
FIG. 3 is a bottom view of the base structure of FIG. 1.

FIGS. 2 and 3 illustrate the tension-compression structure of FIG. 1, but in side view and bottom view, respectively.

Figure 4:
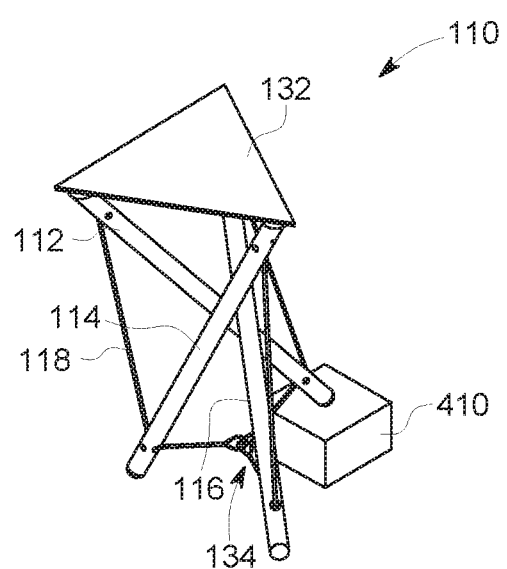
FIG. 4 is a perspective view of a base structure according to the invention with one leg situated atop a support surface irregularity.

FIG. 4 illustrates a stool 110 according to the invention placed upon a terrain irregularity, which is represented in FIG. 4 by a raised block 410. As illustrated, the stool 110 has been adjusted to accommodate the irregularity as enabled by the invention.

As shown in FIG. 4, the legs 112, 114, and 116 of a stool 110 according to the invention are constrained somewhat by the upper platform 132 and the lower constraint segments 134, but otherwise are essentially free to adjustably slide along the tensegrity tension elements 118 to accommodate irregular terrain (subject, of course, to a desirable level of friction between the legs 112, 114, and 116 and the tension elements 118 which tends to avoid excessive and undesirable adjustments as weight is placed on the stool 110).

When weight is applied, the legs 112, 114, and 116 of a tension-compression structure 110 according to the invention move outward at both top and bottom against the constraints (the upper platform 132 and the lower constraint segments 134), and individually move down and/or outward to meet the terrain. Once the legs 112, 114, and 116 are in position, the upper platform 132 can be adjusted to suit the user's needs or comfort.

The irregularity shown in FIG. 4 is exaggerated for purposes of illustration. A tension-compression base structure 110 according to the invention can accommodate this movement and more. Various angles and configurations can be achieved while maintaining the center of gravity of the structure within a region bounded by the legs 112, 114, 116. Accordingly, a structure according to the invention is suitable for moderately irregular terrain.

Referring to FIGS. 4A through 4D, the magnitude of the linear displacement of the center of gravity (CG) of a top plane 1502 when a bottom plane 1504 and the top plane 1502 are not parallel is related to several factors. A structure can be built where a large angular displacement between the planes 1502, 1504 does not cause the upper center of gravity (noted by a line extending from the upper plane 1502) to move outside of the region bounded by the legs 112, 114, and 116 (not shown) such that the structure will remain stable even after an extreme displacement.

FIGS. 4A through 4D show two-dimensional pictorial schematics that show the effects of modifying the aspect ratios of the struts to the effective horizontal tendon lengths. Each of the FIGS. 4A through 4D show both the upright configuration (left hand side) and the angular displacement (right hand side) where the center of gravity crosses the lower support boundary, of, in other words, where the structure becomes unstable and tends to tip over without outside support. Infinite permutations of these length aspect ratio lengths are possible. FIGS. 4A through 4D show exemplary representations of this variability. Also, tendons are omitted from these representations for clarity, but assumed to be present in the structure.

Figure 4A:
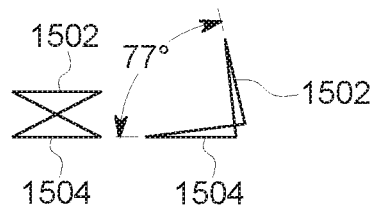
FIGS. 4A-4D illustrate both the upright configuration and the angular displacement where the center of gravity crosses the lower support boundary, showing the effects of modifying the aspect ratios of the struts to the effective horizontal tendon lengths.
Figure 4B:
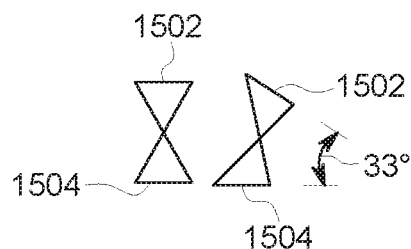
Figure 4C:
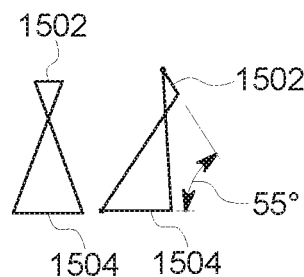
Figure 4D:
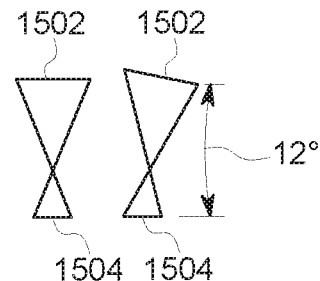

FIG. 4A shows an example where the strut and horizontal lengths can be near parity while still providing a stable structure. FIG. 4B shows and example where the strut is approximately two times the horizontal tendon effective length. FIG. 4C shows an example where the upper horizontal tendon length is much smaller than the lower, and the lower effective tendon length is shorter than the strut length. FIG. 4D shows an example where the upper horizontal tendon length is much larger than the lower, and the lower effective tendon length is shorter than strut length.

It may also worth noting that utilizing struts and or horizontal tendons of non-equal length will also have an effect on both angular position/displacement between planes 1502 and 1504 and on linear displacement of the CG at angular displacements.

An article of furniture according to the invention, such as a stool, may also be employed for "active seating" on any suitable surface. The sliding adjustability of the tension elements in a structure according to the invention allows the structure to move and comply with shifts in a user's position or center of gravity, thereby encouraging some continuous use of the user's core muscles to maintain a desired position. Some users may find this desirable, particularly in an office setting or other circumstance that would otherwise be primarily sedentary.

Figure 5:
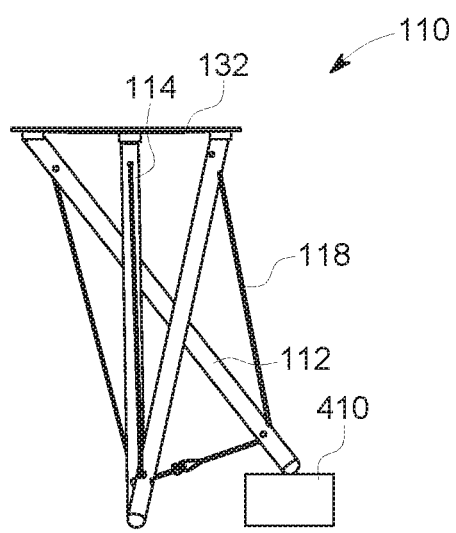
FIG. 5 is a side view of the base structure of FIG. 4.

FIG. 5 illustrates the tension-compression structure of FIG. 4, but in side view for an enhanced understanding of the structure and the relationship among the parts.

Figure 6:
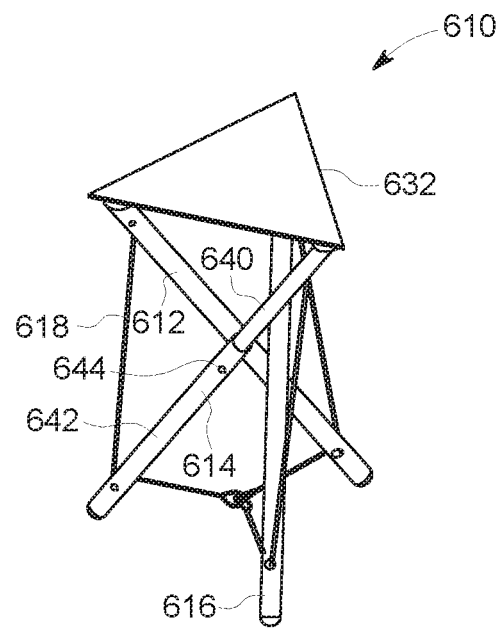
FIG. 6 illustrates a base structure according to the invention provided with a telescoping leg enabling the structure to be collapsed for storage or transportation.

FIG. 6 illustrates a base structure 610 according to the invention provided with a telescoping leg 614. The telescoping leg 614 enables the structure 610 to be collapsed for portability. In some embodiments, in place of telescoping legs 614, the axial position of the pulley/saddle, as located on struts, could be dynamically altered to permit the structure to collapse.

Figure 7:
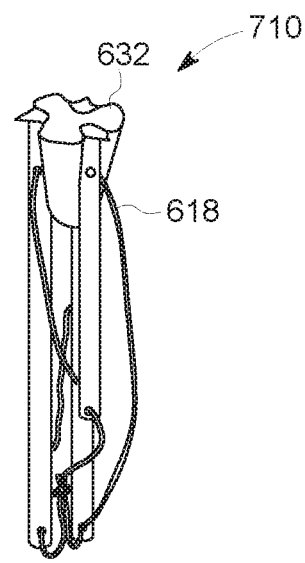
FIG. 7 is the base structure of FIG. 6 in its collapsed state.

As illustrated, one of the compression elements or legs 612, 614, and 616, is a telescoping leg 614 formed from two segments, an upper segment 640 and a lower segment 642. The upper segment 640 is slightly smaller in diameter than the lower segment 642, and hence, the upper segment 640 is capable of sliding axially into and out of the lower segment 642. To maintain the telescoping leg in its fully extended position, the upper segment is provided with a spring-biased pushbutton protrusion 644 at the lower end of the upper segment 640, configured to lock with a mating hole at an upper end of the lower segment 642. When the two segments 640 and 642 are so engaged, the protrusion extends through the hole in the lower segment and the two segments are kept in an extended configuration. To collapse the telescoping leg 614, the pushbutton 644 is depressed to disengage it from the hole, and the two segments 640 and 642 may then be slid together. This releases the tension on the tension elements 618, and allows the stool 610 of FIG. 6 to be collapsed into a bundle 710 (FIG. 7). In such a configuration, the upper platform 632 is desirably flexible, and is able to bend, fold, or otherwise conform with the collapsed bundle of legs. And the tension elements 618, being flexible, are also able to move and comply with the collapsed state 710 of the structure 610. Although a pushbutton 644 detent is described in some detail herein, it will be readily recognized that other locking structures are possible, such as twist locks and flip locks, as well as yet other alternatives that will be understood by a person of ordinary skill in mechanical design.

FIG. 7 is the base structure 610 of FIG. 6 in its collapsed state 710. In its collapsed state 710, a tension-compression structure according to the invention can be kept in a tube-shaped container or convenient shoulder bag, or strapped to a pack for easy transport. It should be noted that the tension elements 618 shown in FIG. 7 are illustrated in one possible slack state; the tension elements 618 can be arranged in other ways, tucked, wrapped, or folded around the compression elements 612, 614, and 616 and other portions of the structure 710 as desired.

Figure 8:
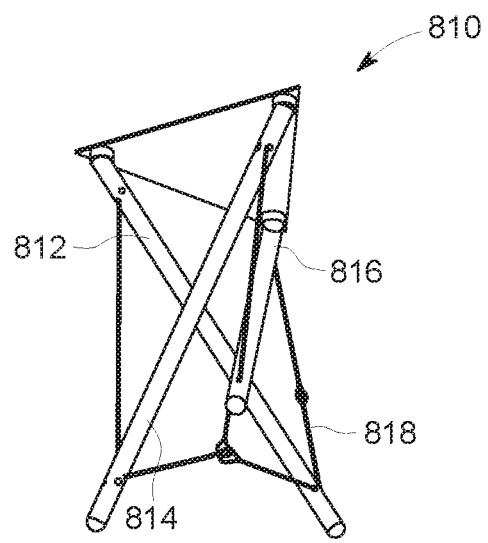
FIG. 8 illustrates a base structure according to the invention provided with a disconnectable tension element enabling the structure to be collapsed for storage or transportation.

FIG. 8 illustrates a base structure 810 according to the invention provided with a disconnectable tension element 818. Disconnecting this tension element 818 releases the tension and enables the structure 810 to be collapsed into a bundle 910 (FIG. 9) for storage or transportation.

The disconnectable tension element, in an embodiment of the invention, may take the form of a carabiner (on one end of the tension element 818) and loop (on the other end), or alternatively one of many different kinds of release mechanisms, including but not limited to plastic quick-disconnect clips, magnetic mechanisms, hooks, and many other possibilities. In an embodiment of the invention, the tension element 818 is not fully disconnected to collapse the structure, but is loosened sufficiently to allow the legs 812, 814, and 816 to move into a collapsed bundle 910 (FIG. 9); in this configuration, a strap buckle, turnbuckle, or lever apparatus may be used, and other options will be recognized by a practitioner of ordinary skill in the art.

Figure 9:
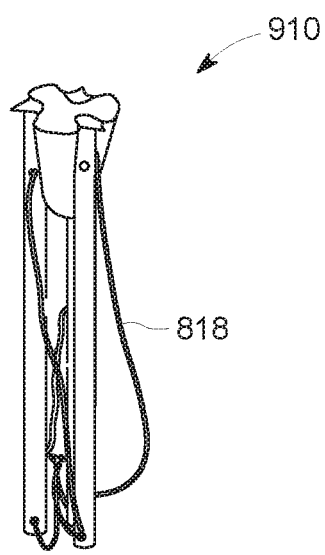
FIG. 9 is the base structure of FIG. 8 in its collapsed state.

FIG. 9 is the base structure 810 of FIG. 8 in its collapsed state 910. As with the embodiment of FIGS. 6-7, the structure resembles a bundle and can be easily stored or transported. As with FIG. 7, the tension elements 818 are shown in one possible collapsed configuration, and can be arranged in other ways as well.

Figure 10:
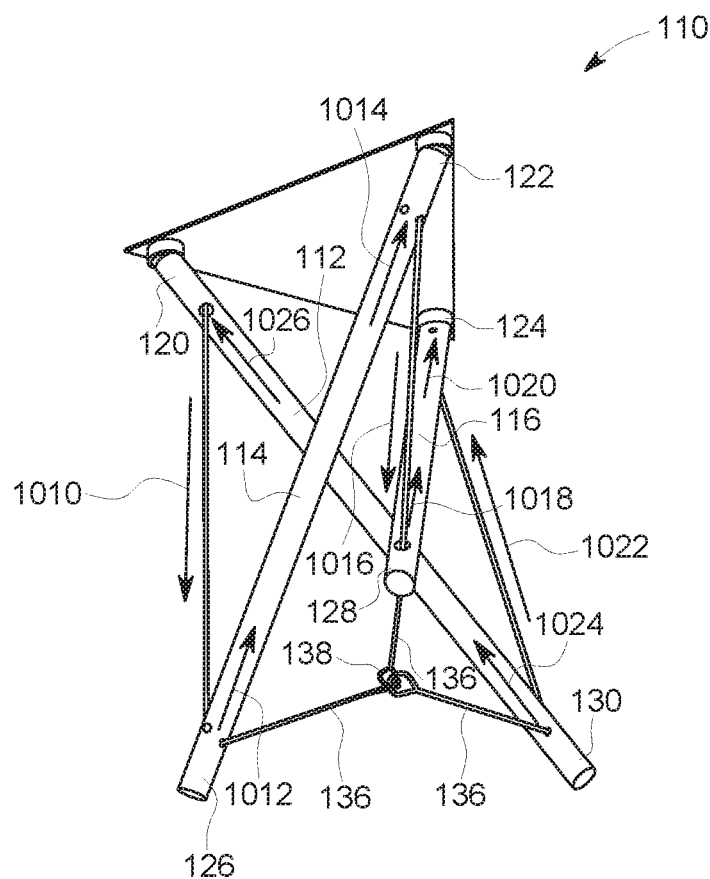
FIG. 10 is a depiction of a base structure according to the invention as seen from below, with arrows indicating a path of slidably adjustable tension elements.

FIG. 10 illustrates the path taken by the tension elements 118 in a base structure 110 according to the invention via arrows.

As discussed above in connection with FIG. 1, an embodiment of the invention includes tension elements 118 formed from a single loop of material, either as a closed loop or as an openable loop (as shown, for example, in FIGS. 8-9). The arrows in FIG. 10 illustrate an exemplary pathway for such a single closed or openable loop, inside each of the legs and connecting adjacent legs as described above. Although the arrows of FIG. 10 are shown as having a directionality, this is solely to enable an understanding and to more easily trace the entire path—it should be recognized that the tension elements are capable of sliding adjustability in both directions, not just in the direction represented by the arrows.

As shown in FIG. 10, starting somewhat arbitrarily at the upper end 120 of the first leg 112, the tension element 118 traverses the structure 110 externally along a first arrow 1010 to the lower end 126 of the second leg 114, then internally within the second leg along second and third arrows 1012 and 1014 to the upper end 122 of the second leg 114, then externally again along a fourth arrow 1016 to the lower end 128 of the third leg 116, then internally again along fifth and sixth arrows 1018 and 1020 to the upper end 124 of the third leg 116, then externally again along a seventh arrow 1022 to the lower end 130 of the first leg 120, then internally again along eighth and ninth arrows 1024 and 1026 to the upper end 120 of the first leg 112, closing the loop.

As noted above, the tension elements traverse the structure inside each of the legs 112, 114, and 116 and outside the legs (and between adjacent legs). As the tension elements transition between inside and outside of the legs, it is considered advantageous to provide a smooth and non-abrasive surface for them to slide over. Accordingly, the legs may be provided with saddle structures 1030, either internal to the legs or at the openings where the tension elements enter or exit the tubular legs. Such saddle structures 1030 provide the ability for the tension elements 118 and compression elements 112, 114, and 116 to move with respect to each other, while ensuring the tension elements 118 do not tend to fray over the course of time. The saddle structures 1030 also provide sufficient friction to ensure the tension-compression structure remains in a desired orientation and position without undue adjustment while it is being used. A practitioner of ordinary skill will recognize, of course, that the saddle structures may be replaced with pulleys, wheels, or simply flanged entry/exit holes or lips as desired; there are many other possibilities.

FIG. 10 shows the legs 112, 114, and 116 of the tension-compression structure held together at the bottom via a central junction 138 among three flexible constraint segments 136, as discussed above with reference to FIG. 1. It should be noted that an alternative arrangement uses constraint segments to connect the legs in a triangular configuration without a central junction; neither this path nor the configuration that includes a central junction is adapted for sliding adjustment, as it is intended to constrain the lower portions of the legs. Other configurations for a lower constraint may be apparent to a practitioner of ordinary skill, and shall be deemed to be within the scope of the invention.

Figure 13:
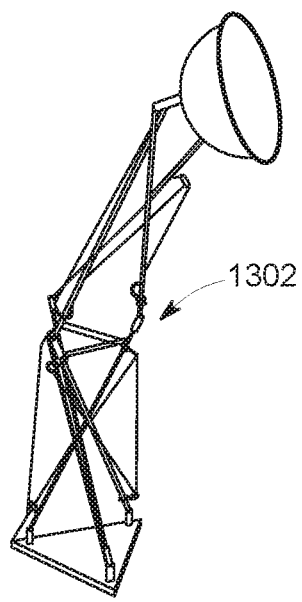
FIG. 13 illustrates a two-stage structure using two of the base structures of FIG. 1 and configured for use as a lamp.
Figure 14A:
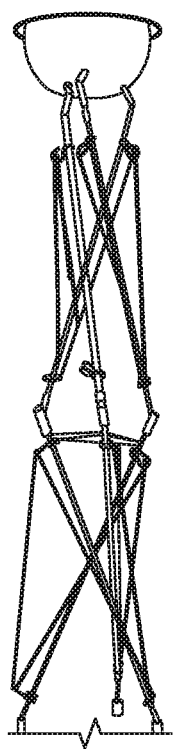
FIGS. 14A and 14B illustrate the two-stage structure of FIG. 13, illustrating various configurations showing an increased range of motion.
Figure 14B:
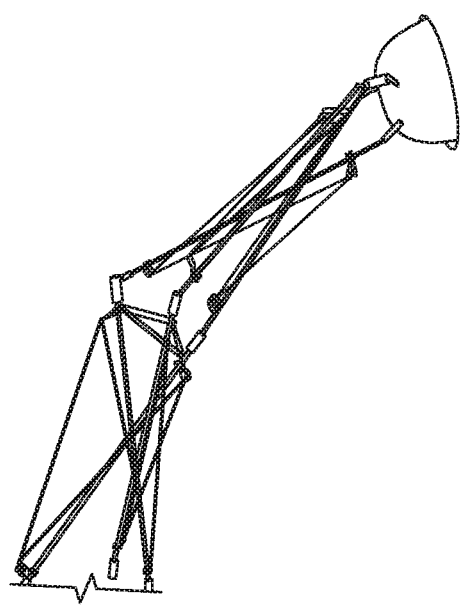

Referring now to FIGS. 13, 14A and 14B, the degrees of freedom for the support structure may be increased in various manners. For example, two or more structures (two structures joined together are shown in FIGS. 13, 14A and 14B) can be stacked for increased range of motion. The ends 1302 of the structures can be coupled with two degrees of freedom with a ball-type coupling, or other method that fixes the relative distance but allows spherical motion. In some embodiments, the lower ends may be coupled to the horizontal tendons of an adjacent structure.

FIGS. 13, 14A and 14B show a lighting application. By controlling the friction, a system can be made that allows the positioning of the surfaces and a desired position can be maintained after the outside force (such as a user making an adjustment) is removed. While two structures are shown stacked together, other numbers of units can be stacked within embodiments of the present invention. Such structures can be used in applications in addition to the lamp application shown in the figures. For example, the structures of the present invention can function as simulated ball and socket joints for prosthetics and bio-inspired robots, such as snakes and for underwater propulsion via flipper-based motion, for example.

Figure 15:
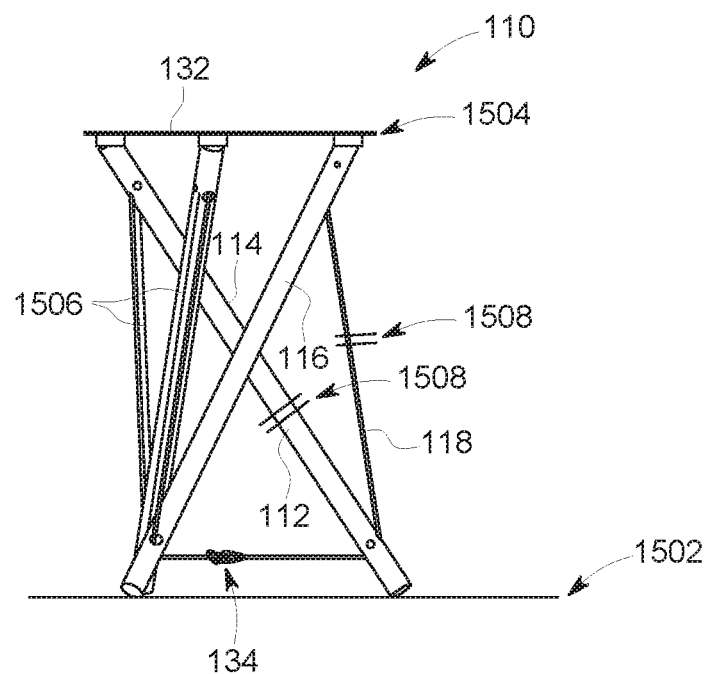
FIGS. 15 and 16 show methods for passive and dynamic motion control of the structure.
Figure 16:
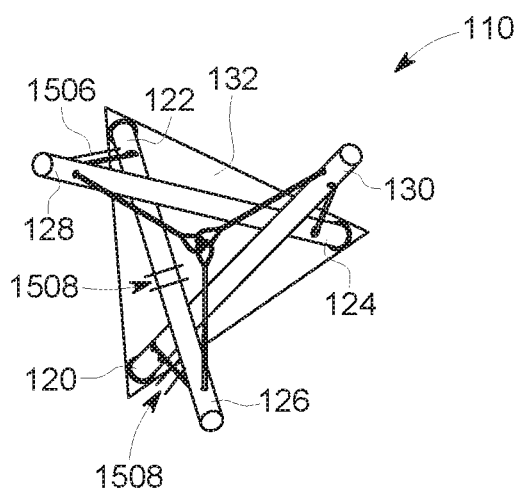

Referring now to FIGS. 15 and 16, a repeatable angular relationship can be established between a first plane 1502 formed by the first end of the structure and a second plane 1504 formed by the second end of the structure on deployment from the collapsed state. Without constraints, the relationship between the top plane and the bottom is relatively random after deployment of the structure from a stowed configuration.

Fixed length tendons 1506 can be added parallel to the external "vertical" portions of the slidably-connected-tendon. The fixed length tendons 1506 serve to control the relative position of the two planes 1502, 1504. Using one fixed length tendon 1506 will only partially control the relative orientation. Using two fixed length tendons 1506, as shown in FIGS. 15 and 16, can fix the orientation. This is effective using any known method to collapse the structure, such as disconnecting a link (shown by cross lines 1508 in FIGS. 15 and 16) in the slidable tendon, using telescoping leg(s), changing location of the pulleys to decrease the length between them, or the like.

A benefit from the embodiment of FIGS. 15 and 16 is that a deployable structure can be made that requires only one actuator to deploy the structure. Large structures can be made with simple assembly.

While the above embodiments describe the slidably connected tendon as being a continuous loop, in some embodiments, ends of the tendon may be anchored at one tube end. In some embodiments, the tendon ends could be anchored at opposite ends of the same tube for the same effect. Full range of motion can be preserved, even with anchored tendons, provided that at least four sliding surfaces, for a three-strut structure, are active. For structures using additional struts, then at least 2N-2, where N is the number of struts, sliding surfaces need to be present for full range of motion to be preserved. Fewer sliding surfaces, such as pulleys, saddles, or the like, can restrict the range of motion to some degree.

In some embodiments, the structure can use one fixed length tendon 1506 parallel to one vertical tendon to limit the angular displacement of the second plane 1504 formed by the top ends of the legs. Positioning the restrained tendon in the "front" of the structure can limit the angular displacement toward the back. This could be a safety feature for a stool, for example, as it can be surprising to the novice to feel like they will tumble backwards. In some embodiments, the fixed length tendon 1506 may be removed as a user becomes accustomed to the stool. In some embodiments, the fixed length tendon 1506 can be high in elasticity to reduce abrupt stops. In some embodiments, the fixed length tendon 1506 can be low in elasticity for precise positioning control.

In some embodiments, a counterweight can be rigidly affixed to a top rigid plane, but having a low center of gravity. Any angular offset from level will introduce a righting-torque on the top surface 1504 (see FIG. 15) via the introduced moment arm between the counterweight and the top surface. This can be useful, for example, in a gimbaled table (used on water craft, for example) or as a passive steady cam.

In some embodiments, a brake can be added to one or more of the pulleys. This can lock the position of the two planes, 1502, 1504. This could be useful, for example, to set up a table on uneven surfaces, where, after adjustment, stability is desired. In some embodiments, the brakes can be manually controlled by the user by, for example, a cam lock against the cordage, against the pulley, or as a brake applied to a pulley hub, or wheel—binary or proportional. In some embodiments, the brake can be an electromechanically controlled proportional brake, such as a servo or other motors, using known techniques for direct current (DC) motor braking, or binary, solenoid controlled. In some embodiments, the brake can integrate means to control friction which would result in resistance to swivel. This may be performed, for example, with a manually adjustable brake, a proportionally controlled brake, such as an electromechanical digital or analog controlled, indexing detents, a spring bias to home position that can be proportionally adjustable, or the like.

Figure 17:
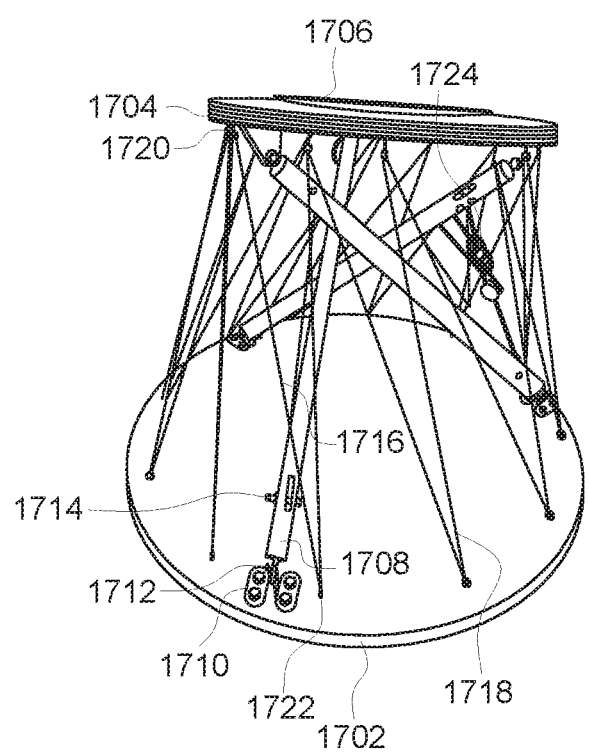
FIG. 17 illustrates an alternate form of a base structure, according to an embodiment of the present invention, capable of serving as a stool, including three compression elements serving as legs and an upper surface seating platform.

Referring to FIG. 17, in some embodiments, the tendon 1716 may be replaced by or be supplemented by a cord system. While FIG. 17 still shows the tendon 1716 connected at one end to a removable connector 1724 and passing through supports 1714 in the legs 1708, the tendon 1716 may be disconnected and removed while the design of FIG. 17 would still be operable.

The design of FIG. 17 is similar to the above described designs in that three legs 1708 interconnect a top member 1704 and a base member 1702. Connectors 1710 may be used to connect the legs 1708 to each of the top 1704 and the base 1702. A pivot connection, such as a spherical connection 1712, may be provided to permit the legs 1708 to pivot about a central point relative to the connectors 1710. As used herein, the term "pivot" or "pivoting" may describe movement about an axis or movement about a point, such as the case with a ball joint or a ball and socket connection. This design includes a plurality of top eye hooks 1720 attached to an underside of a top member 1704 and a plurality of bottom eye hooks 1722 attached to a topside of a base member 1702. Various other connectors, in place of eye hooks, may be used, such as anchors, hooks, U-bolts, or the like, to secure the cord. A seat or swivel 1706 may be disposed on top of the top member 1704, depending on the particular application.

A cord 1718, such as an elastic cord, may extend through one of the top eye hooks 1720, down to a base eye hook 1722, back up to an adjacent one of the top eye hooks 1720, back down to an adjacent one of the bottom eye hooks 1722 until the cord 1718 is disposed about the entire periphery of the stool. Depending on the elasticity of the cord, the cord 1718 may be allowed to slide within the eye hooks 1722, 1724, but this is not necessary. In some embodiments, the net tension vector from the elastic cord(s) 1718 can result in a torque between the base and top members 1702, 1704 that results in the legs 1708 being held separate and not contact each other in a central location there along.

In some embodiments, the cord 1718 may be replaced by an inelastic cord and pulleys may be used to permit sliding of the inelastic cord.

Figure 18:
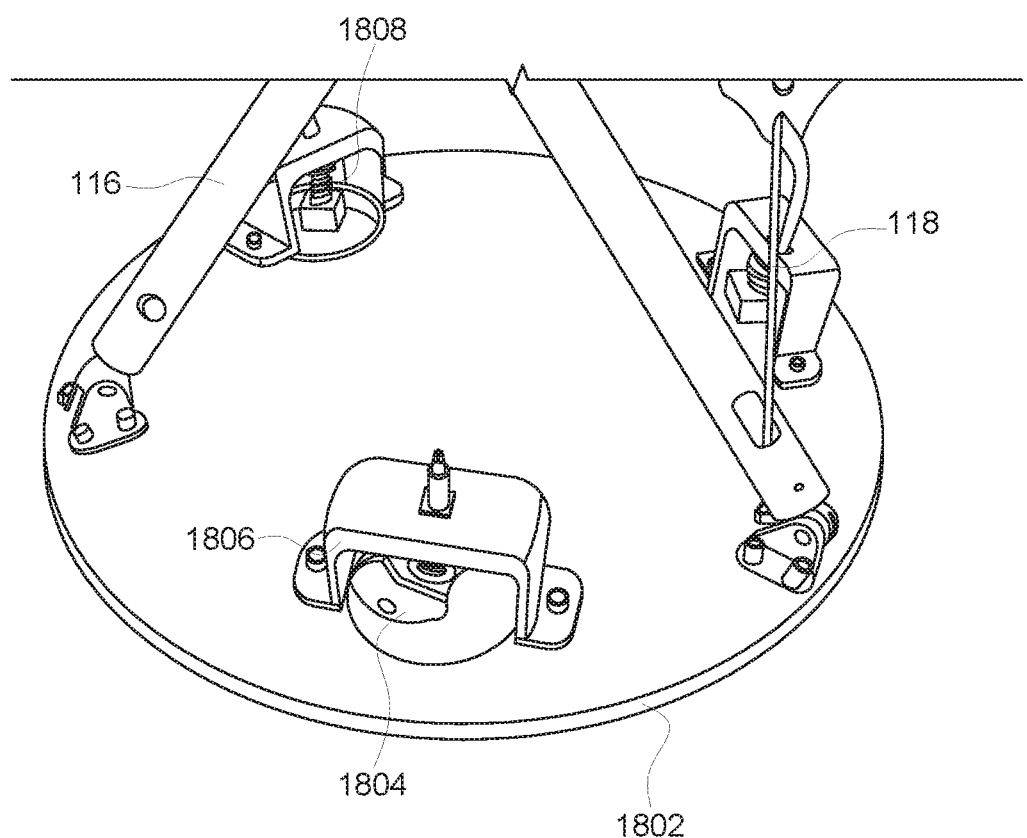
FIG. 18 illustrates a detailed view of a base platform of a base structure having retracting wheels according to an embodiment of the present invention.

In some embodiments, as shown in FIG. 18, casters or wheels 1804, as are known in the art may be attached to the legs 116 or to a base 1802 supporting the legs 116. These casters or wheels 1804 may be biased by a spring 1808 and attached to the base 1802 to facilitate moving the stool around. In some embodiments, the casters or wheels 1804 may retract into a wheel attachment structure 1806 attached to the base 1802 when a user sits to cause the base 1802 to directly contact the surface, preventing movement of the stool when the user leans. The springs 1808 may be configured to permit the casters or wheels 1804 to support the stool when there is no user sitting thereupon, permitting the stool to be moved about on the rolling casters or wheels 1804. The springs 1808 may have sufficient resiliency to move completely within the wheel attachment structure 1806 when a person is sitting on the stool, resulting in the base 1802 contacting the surface that supports the stool.

Referring now to FIGS. 19 through 22, height adjustability of the structure may be desirable when used as an ergonomic seating device. For each person, there is an optimum ergonomic height. For size, weight and aesthetic reasons, changing the length of the compression members can be a desirable method of achieving height adjustability of the seat. A longer compression member (also referred to as a strut) can provide a higher seat position.

Changing the length of the compression members between the pulleys would require a highly variable length of tension member. For example, if the each tube was lengthened by six inches, the length of tension member would be required to increase approximately six times that, or about 36 inches. Stowing this much extra cordage would be an aesthetic problem.

Therefore, embodiments of the present invention may shorten the length between pulleys by moving the lower pulley location inward from its nearest end, effectively shortening the overall length of the tension loop. Below the lower pulley, a telescoping mechanism can be installed in each compression element. When the telescope length increases the length of the compression element, this increases the angle of the compression element, relative to the ground such that a short strut can produce a low seat height and a low strut angle with the ground. Even with a fixed pulley span in each tube, as the strut angle with the ground increases, the length of the "loop" tension member would also increase slightly. Accordingly, a tension member tensioner, such as a spring, can be added inline with the "loop" tension member to allow for this increase in required length. Adding the spring can result in a relatively constant tensile force in the cord (tension element) across the adjustment range.

For a system with fixed length struts, the "loop" tension member tends to stretch/contract over time due to various factors. The structure typically operates best at a specific tension level in this "loop" tension member. For example, if too tight, and the pulleys may offer resistance, while if too loose, the compression elements may touch and grind on each other.

When a spring, or similar type of tensioning mechanism, is applied inline with the "loop" tension member, it can maintain the optimum tensile range throughout normal tension member length changes. This removes the customer's requirement to periodically adjust their chair.

This spring addition can be applied to the original structure as well, as discussed above, including, for example, a folding camp stool. The spring can, for example, eliminate customer required adjustments. Platforms and ball joints, as shown in FIGS. 19 through 22 and as described in greater detail below, are not required for the effectiveness of the spring.

Figure 19:
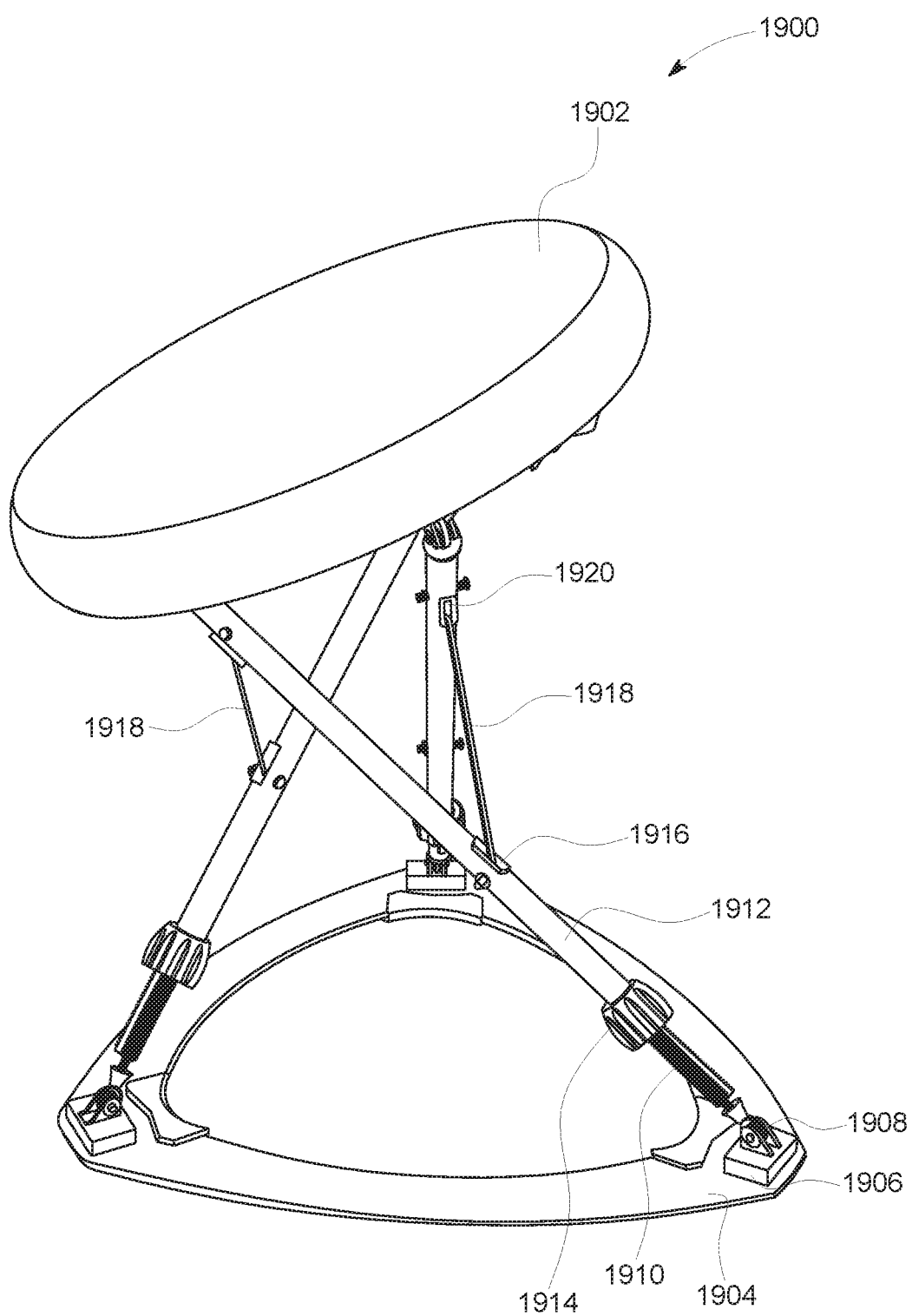
FIG. 19 illustrates a tension-compression base structure having an adjustable height seat according to an exemplary embodiment of the present invention.

Referring specifically to FIG. 19, a perspective view of a tension-compression device 1900, also referred to as stool 1900, is shown. The stool 1900 can include a seat 1902 configured for receiving a user sitting thereupon. The seat 1902 may include a swivel member, as discussed above. A base 1904 may be disposed opposite the seat 1902. A plurality of compression elements 1912 may extend between the seat 1902 and the base 1904.

The compression elements 1912 may attach directly to the base 1904 or may include an intermediate attachment block 1906 disposed therebetween. A pivoting joint, such as a ball joint 1908, may be disposed to permit relative motion between each of the compression elements 1912 and the base 1904. A similar attachment mechanism may be used to connect the seat 1902 to the compression elements 1912.

In the discussion in the following paragraph, a first end of a compression member refers to an upper end thereof, while the second end of a compression member refers to a lower end thereof. The terms "upper" and "lower", in this embodiment, refer to relative position along a length of the compression member 1912 and does not require that the upper or lower ends be at or adjacent a terminus of the compression member.

A tension element 1918 may extend from the first end a first one of the compression elements 1912 to the second end of a second, adjacent one of the compression elements 1212. The tension element 1918 may then run along side the second one of the compression elements 1912 or may run along an interior of the second one of the compression elements 1912 to reach the first end of the second one of the compression elements 1912. The tension element 1918 can then connect the first end of the second one of the compression elements 1912 to the second end of a third one of the compression elements 1912. The tension element 1918 may then run alongside the third one of the compression elements 1912 or may run along an interior of the third one of the compression elements 1912 to reach the first end of the third one of the compression elements 1912. The tension element 1918 can then connect the first end of the third one of the compression elements 1912 to the second end of the first one of the compression elements 1912. The tension element 1918 may then run alongside the first one of the compression elements 1912 or may run along an interior of the first one of the compression elements 1912 to reach the first end of the first one of the compression elements 1912 to form the loop. In FIG. 19, the tension element 1918 runs inside each of the compression elements 1912 adjacent openings 1916, 1920 formed therein.

In some embodiments, pulleys 1952 (see FIG. 20) may be disposed where the tension element 1918 makes the turn from spanning adjacent compression elements to running along side or inside one of the compression elements. Other guide members or tension element glide members may be used in place of the pulleys 1952.

In the embodiment shown in FIG. 19, the opening 1916 at the second end of each of the compression elements 1912 may be spaced apart from a bottom end of the compression element. Such a position can permit a telescoping member 1910 to move into the compression element 1912, for a reduced height of the seat 1902, or move out of the compression element 1912 for an increased height of the seat 1902. Various mechanisms may be provided for such height adjustment. Further, while FIG. 19 shows the height adjustment mechanism at the second (bottom) end of each of the compression elements 1912, it should be understood that the height adjustment mechanism may be disposed at the first (top) end or even at both ends of each of the compression elements 1912. In some embodiments, a knob 1914 may permit adjustment of the telescoping member 1910, which may be threadingly engaged with each of the compression elements 1912. Two embodiments of the height adjustment mechanism are exemplified in FIGS. 20 through 22, described below.

Figure 20:
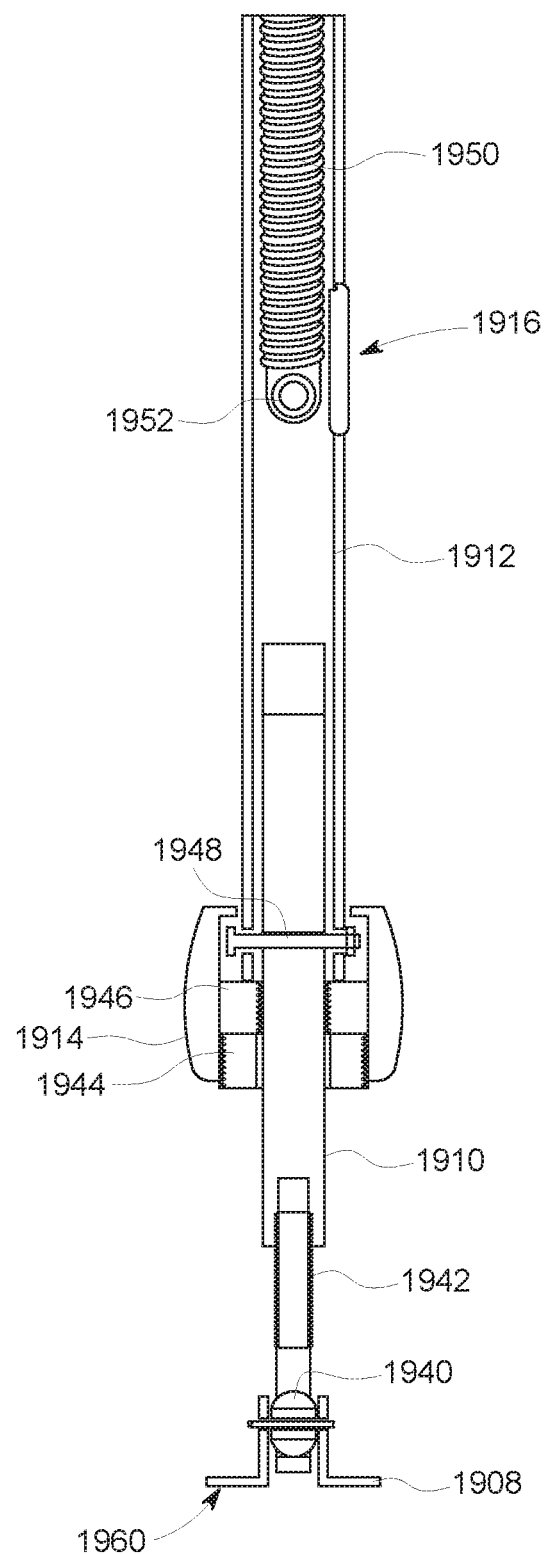
FIG. 20 illustrates a cut-away view of one of the compression elements of the base structure of FIG. 19.
Figure 21:
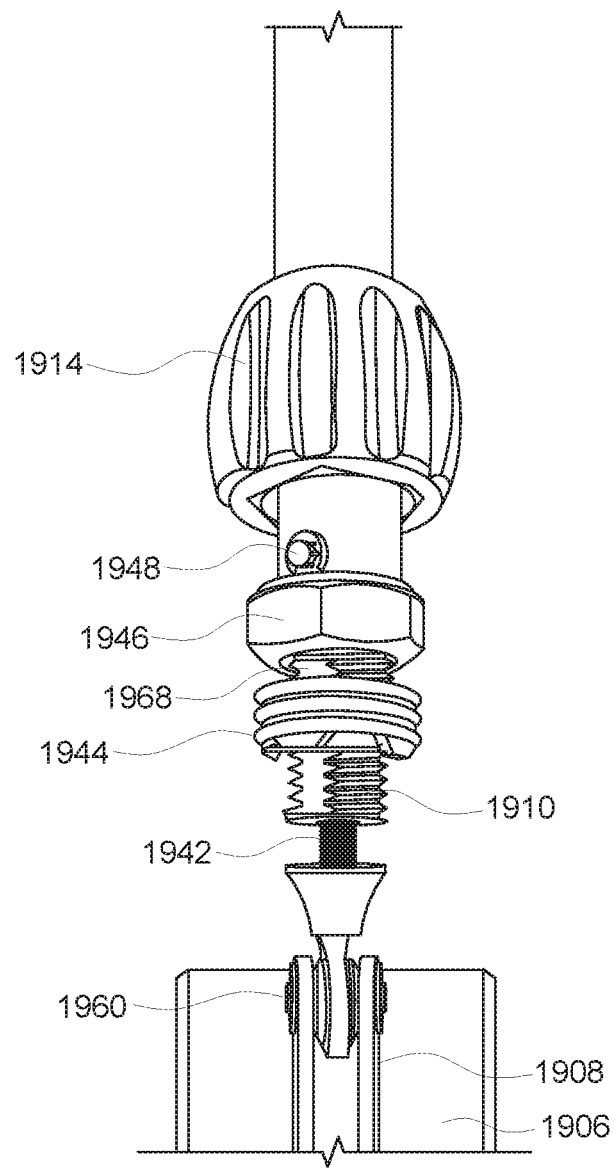
FIG. 21 illustrates a detailed view of the height adjustment mechanism of the height adjustable compression element of FIG. 20.

Referring specifically to FIGS. 20 and 21, the telescoping member 1910 can be a threaded rod having a slot 1968 formed partially along a length thereof. A pin 1948 may be disposed through an end of the compression element 1912 and through the slot 1968. The pin 1948 may prevent rotation of the telescoping member 1910 during height adjustment, as described below.

The knob 1914 may be turned and moved to reveal a knob retainer 1944 onto which the knob 1914 may thread therewith. Between the knob retainer 1944 and the pin 1948, a nut 1946 may be threaded on the threaded telescoping member 1910. Turning the nut 1946 can cause the telescoping member 1910 to retract into or extend from the compression element 1912.

At the distal end of the telescoping member 1910, a joint connector 1942 may extend to terminate with a connector, such as a ball 1940, at a joint, such as a ball joint 1960, for example.

A tensioning member, such as a spring 1950 may be provided inline with the tension element 1918 (see FIG. 19). The spring 1950 may be disposed at any position inline with the tension element 1918. In FIG. 20, the spring 1950 may be attached to the pulley 1952, where the tension element 1918 may be secured to each end of the spring 1950. Of course, other configurations may be provided, so long as the tensioning member, such as the spring 1950, can provided tension for the tension element 1918. The spring 1950 may be disposed at any one or more location along the tension element 1918. For example, the spring may be disposed inside compression element 1912, as shown in FIG. 20, or may be disposed inline with the tension element 1918 as it spans between opposite ends of the compression element 1912. In some embodiments, a tensioning member, such as a spring, may be disposed inside each of the compression elements 1912.

While a coil spring is shown, other tensioning members may be contemplated within the scope of the present invention. Leaf springs, resilient protrusions inside the compression elements, manual turnbuckles, or the like, may be used to provide proper tension in the tension element 1918. Typically, the tensioning member will be a resilient member so that, as small changes in length, either shortening or extension, occur, the resilient member can provide appropriate tension in the tension element 1918.

While the spring 1950 is shown in FIG. 20, it should be understood that tensioning members, such as the spring 1950, may be used in any of the embodiments described herein. Typically, where height adjustment is performed, as discussed above, a tensioning member, such as the spring 1950, is desirable to maintain tension during height adjustments that may change the relative angle of each compression element with respect to the base which, accordingly, may cause small changes in the required length of the tension element 1918 to maintain proper tension therein.

Figure 22:
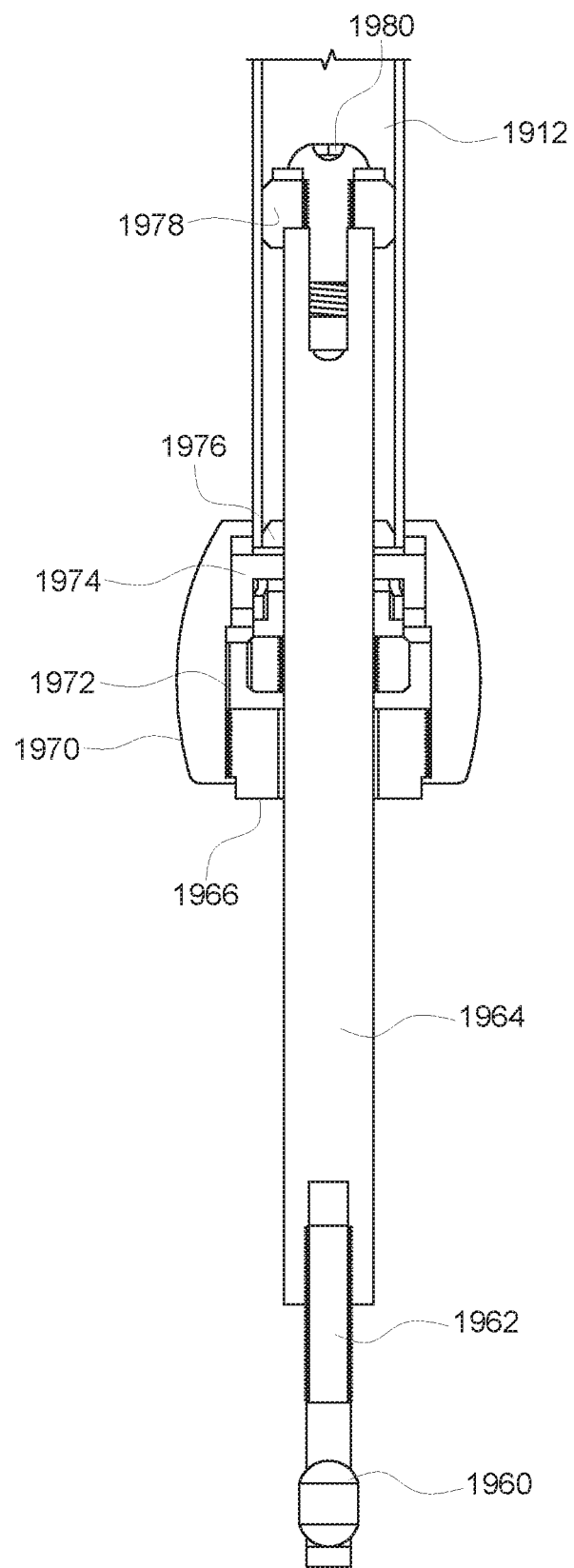
FIG. 22 illustrates a cut-away view of another embodiment of a height-adjustable compression element design for the base structure of FIG. 19.

Referring now to FIG. 22, another height adjustment mechanism is shown, where a telescoping member 1964 can be adjustable extended from the end of the compression elements 1912. Similar to the embodiment described above, a connector 1962 may connect the telescoping member 1964 to the ball joint 1960. A proximal end of the telescoping member 1964, that is, the end inside the compression element 1912, may include a moving bushing 1978 disposed on an end thereof and secured with a screw 1980. The moving bushing 1978 may have an outer diameter that approximates an inside diameter of the compression element 1912 such that the moving bushing 1978 may slide along an interior of the compression element 1912.

Similar to the embodiment of FIGS. 20 and 21, a knob 1970 may be threaded onto a knob retainer 1966 to covering an adjusting nut 1972. A bushing 1976 may be disposed between the nut 1972 and a bushing retainer 1974 such that turning the nut may cause the bushing 1976 to lock onto the telescoping member 1964 to prevent movement thereof relative to the compression element 1912. Turning the nut 1972 in the other direction may release the bushing 1976 to permit the telescoping member 1964 to extend from or retract into the compression element 1912.

While the above provides two types of height adjustment mechanisms using a telescoping member, it should be understood that various height adjustment mechanisms may be used within the scope of the present invention. Of course, such height adjustment mechanisms should be sufficient to retain the telescoping member in place up to a maximum load that may be applied to the compression elements.

Figure 23:
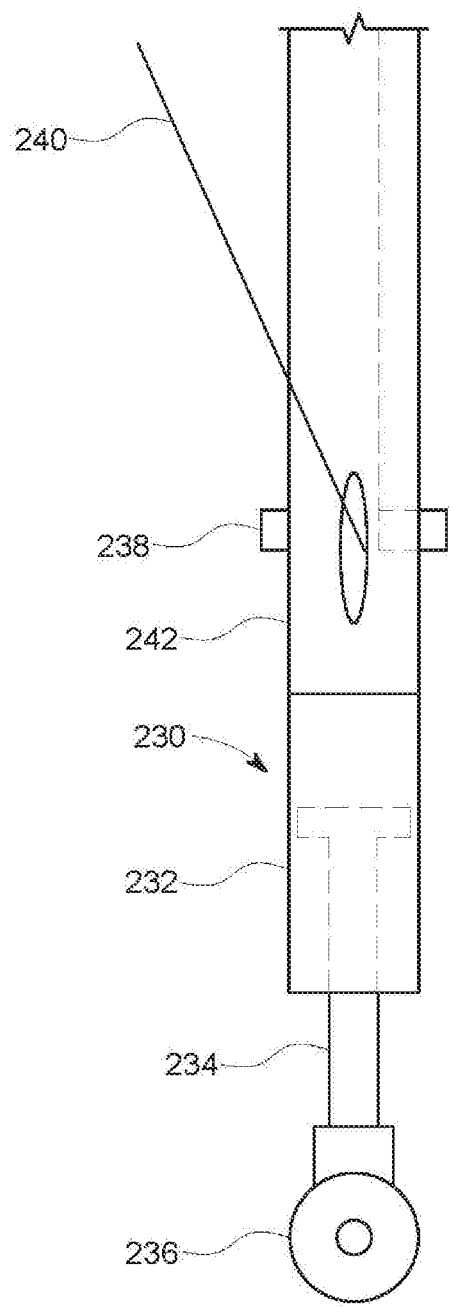
FIG. 23 illustrates a side view of a gas spring structure usable in the compression elements according to exemplary embodiments of the present invention.

For example, FIG. 23 illustrates an example of how a gas cylinder system 230 may be implemented. In this embodiment, a gas cylinder 232 may be disposed along a length of a compression element 242 having a tension element 240 disposed about a pulley 238, or the like, as described above. The gas cylinder 232 may be a remove release gas cylinder similar to those found for height adjustments in office chairs. An extension 234 can extend out of the gas cylinder 232 and terminate at a spherical joint 236 for attachment to a base structure, such as those discussed above.

In some embodiments, a linear actuator can be added parallel and adjacent to one or more of the exposed sections of the vertical tendons. These could be located in positions similar to those described in FIGS. 15 and 16 with respect to the fixed length tendons 1506. The actuators could be a linear motor, a lead screw based system, muscle wire, or other type of linear actuator. In some embodiments, an actuator can be used to rotationally actuate one or more pulleys. This may be, for example, an electromechanical or hydraulic actuator, where a motion routine may be programmed and the output can actively move, with the effect similar to sitting on a rocking boat or slow motion mechanical bull. This would require active response by the user to remain sitting while the seat moved underneath the user. In some embodiments, an actuator can be used to actuate one or more joints, such as the leg/top surface interface and/or swivel. This may be, for example, an electromechanical or hydraulic actuator, where a motion routine may be programmed and the output can actively move, with the effect similar to sitting on a rocking boat. This would require active response by the user to remain sitting while the seat moved underneath the user. In some embodiments, an embedded motion controller can be used to control one or more actuators. In some embodiments, an algorithm can be used to predict relative positions, especially for dynamic applications. Similar calculations can be used to control flight simulators based on linear actuators.

In some embodiments, sensors can be used to make various measurements, such as position, load, torque, and the like. The sensors can include, for example, an inertial measurement unit, including one or more of a gyroscope, accelerometer, magnetometer, for example, on the seat. In some embodiments, a data reduction algorithm can be integrated into the device to display and track activity levels via Bluetooth®, Xigbee®, Wi-Fi or some other communication protocol to a computer. In some embodiments, an algorithm can be used to remind a user to keep active. In some embodiments, a means to control friction can be integrated into the seat/strut structure including, for example, a manually adjustable brake, a digital or analog-controlled proportionally controlled brake, or the like.

In some embodiments, the structure of the present invention can include various motion control mechanisms. For example, embodiments of the present invention can include a mechanism to lock out motion when the stool senses that the user is getting up from the stool and while the stool is not in use so that when the user is transitioning into the seat, the structure is rigid instead of compliant. This can be achieved by various mechanisms, including some of those described above.

The present invention may be used for various functions in addition to the stool as herein shown and described. For example, the structure of the present invention may be used as a solar tracker, where a combination of sensors and mechanical actuators can be used as a solar tracking base or a satellite tracking device. In addition, the structure of the present invention may be stacked, as described above, and may include sensors and actuators to provide feedback. In these embodiments, the structure may be used as a robot arm, crane, exercise equipment or the like. As exercise equipment, for example, a motion profile can be provided to the user to target specific muscle groups. Resistance may be provided along the profile, but the motion profile may be maintained, as if the motion were restrained by a track. This embodiment may use, for example, three units stacked with an end-effector receiver mounted on a rotary joint, providing a seven degree of freedom arm.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A tension-compression base structure comprising:
   at least three independent, physically separate compression elements, each having a first end and a second end;
   at least one tension element;
   a constraint at the first end of the structure, the constraint operable to hold each of the first ends of the compression elements in a desired configuration; and
   at least one tensioning member is provided inline with the at least one tension element to provide a predetermined tension therein, wherein
   the at least one tension element connects one of the compression elements near the first end thereof to another of the compression elements near the second end thereof, holding the compression elements and the at least one tension element in a pre-stressed static equilibrium position;
   the at least one tension element is configured to be slidably adjusted with respect to at least one of the second ends of the compression elements; and
   the at least one tensioning member is a spring.

2. The tension-compression base structure according to claim 1, wherein the constraint comprises a seat.

3. The tension-compression base structure according to claim 2, wherein a top member of the seat has an adjustable height.

4. The tension-compression base structure according to claim 1, wherein each of the compression elements is adjustable in height.

5. The tension-compression base structure according to claim 1, wherein the at least one tension element is selectively disconnectable from at least one of the compression elements to enable the base structure to be collapsed.

6. The tension-compression base structure according to claim 1, wherein the at least one tension element comprises a single loop.

7. The tension-compression base structure according to claim 1, wherein the at least one tension element is anchored in at least one location.

8. The tension-compression base structure according to claim 1, further comprising at least one fixed length tension element connecting one of the compression elements near the first end thereof to another of the compression elements near the second end thereof.

9. The tension-compression base structure according to claim 8, wherein the at least one fixed length tension element is two fixed length tension elements connecting first and second ones of the compression elements near the first end thereof to respective adjacent ones of the compression elements near the second end thereof.

10. The tension-compression base structure according to claim 1, further comprising:
    a base disposed at the second end of the compression elements, the compression elements being pivotably connected to an upper surface of the base.

11. The tension-compression base structure according to claim 1, further comprising a base pivotably attached to the second end of the compression elements.

12. The tension-compression base structure according to claim 11, further comprising a ball joint connecting the base with the second end of the compression elements.

13. A tension-compression base structure comprising:
    at least three independent, physically separate compression elements, each having a first end and a second end;

at least one tension element;

a constraint at the first end of the structure, the constraint operable to hold each of the first ends of the compression elements in a desired configuration;

at least one tensioning member is provided inline with the at least one tension element to provide a predetermined tension therein; and a base disposed at the second end of the compression elements, the compression elements being pivotably connected to an upper surface of the base, wherein the at least one tension element connects one of the compression elements near the first end thereof to another of the compression elements near the second end thereof, holding the compression elements and the at least one tension element in a pre-stressed static equilibrium position; and the at least one tension element is configured to be slidably adjusted with respect to at least one of the second ends of the compression elements.

14. The tension-compression base structure according to claim 13, wherein each of the compression elements is adjustable in height.

15. The tension-compression base structure according to claim 13, wherein the at least one tension element is selectively disconnectable from at least one of the compression elements to enable the base structure to be collapsed.

16. A tension-compression base structure comprising:

at least three independent, physically separate compression elements, each having a first end and a second end;

at least one tension element;

a constraint at the first end of the structure, the constraint operable to hold each of the first ends of the compression elements in a desired configuration;

at least one tensioning member is provided inline with the at least one tension element to provide a predetermined tension therein; and a base pivotably attached to the second end of the compression elements, wherein the at least one tension element connects one of the compression elements near the first end thereof to another of the compression elements near the second end thereof, holding the compression elements and the at least one tension element in a pre-stressed static equilibrium position; and the at least one tension element is configured to be slidably adjusted with respect to at least one of the second ends of the compression elements.

17. The tension-compression base structure according to claim 16, further comprising a ball joint connecting the base with the second end of the compression elements.

18. The tension-compression base structure according to claim 16, wherein each of the compression elements is adjustable in height.

19. The tension-compression base structure according to claim 16, wherein the at least one tension element is selectively disconnectable from at least one of the compression elements to enable the base structure to be collapsed.

* * * * *